(12) United States Patent
Leu et al.

(10) Patent No.: US 11,396,599 B2
(45) Date of Patent: Jul. 26, 2022

(54) HEAT-SHRINKABLE POLYESTER FILM AND PROCESS FOR MAKING THE SAME

(71) Applicant: FAR EASTERN NEW CENTURY CORPORATION, Taipei (TW)

(72) Inventors: Yow-An Leu, Taipei (TW); Li-Ling Chang, Taipei (TW); Chun-Chia Hsu, Taipei (TW)

(73) Assignee: FAR EASTERN NEW CENTURY CORPORATION, Taipei (TW)

(*) Notice: Subject to any disclaimer, the term of this patent is extended or adjusted under 35 U.S.C. 154(b) by 338 days.

(21) Appl. No.: 16/847,115

(22) Filed: Apr. 13, 2020

(65) Prior Publication Data

US 2020/0332110 A1   Oct. 22, 2020

(30) Foreign Application Priority Data

Apr. 19, 2019 (TW) ................. 108113716

(51) Int. Cl.
| | |
|---|---|
| *C08L 67/02* | (2006.01) |
| *B29C 48/00* | (2019.01) |
| *B29C 48/08* | (2019.01) |
| *C08J 5/18* | (2006.01) |
| *B29K 67/00* | (2006.01) |
| *B29L 7/00* | (2006.01) |

(52) U.S. Cl.
CPC ............ *C08L 67/02* (2013.01); *B29C 48/022* (2019.02); *B29C 48/08* (2019.02); *C08J 5/18* (2013.01); *B29K 2067/00* (2013.01); *B29L 2007/002* (2013.01); *C08J 2367/02* (2013.01); *C08J 2467/02* (2013.01); *C08L 2203/162* (2013.01); *C08L 2205/025* (2013.01)

(58) Field of Classification Search
CPC ... B29C 48/022; B29C 48/08; B29K 2067/00; B29L 2007/002; C08J 2367/02; C08J 2467/02; C08J 5/18; C08L 2203/162; C08L 2205/025; C08L 67/02
See application file for complete search history.

(56) References Cited

U.S. PATENT DOCUMENTS

| | | | | |
|---|---|---|---|---|
| 8,728,594 B2 * | 5/2014 | Haruta | .................... | B29C 55/14 |
| | | | | 428/34.1 |
| 2009/0304997 A1 * | 12/2009 | Haruta | .................. | B29C 55/065 |
| | | | | 428/156 |

* cited by examiner

*Primary Examiner* — Lawrence D Ferguson
(74) *Attorney, Agent, or Firm* — Fox Rothschild LLP; Robert J. Sacco

(57) ABSTRACT

A heat-shrinkable polyester film is made of a polyester resin composition, and has first and second crystal melting peaks at a respective one of first and second melting temperatures determined via differential scanning calorimetry. The heat-shrinkable polyester film further has a melting enthalpy in a range of larger than 0 J/g and at most 7 J/g which is calculated via integration of an area below the second crystal melting peak. The polyester resin composition includes a first polyester resin having a glass transition temperature ranging from 40° C. to 80° C., and a second polyester resin having a crystal melting temperature ranging from 220° C. to 250° C. and a melting enthalpy ranging from 40 J/g to 60 J/g.

21 Claims, 2 Drawing Sheets

US 11,396,599 B2

HEAT-SHRINKABLE POLYESTER FILM AND PROCESS FOR MAKING THE SAME

CROSS-REFERENCE TO RELATED APPLICATION

This application claims priority of Taiwanese Invention Patent Application No. 108113716, filed on Apr. 19, 2019.

FIELD

This disclosure relates to a heat-shrinkable polyester film, and more particularly to a heat-shrinkable polyester film used for labeling and packaging. This disclosure also relates to a process for making the heat-shrinkable polyester film.

BACKGROUND

A conventional heat-shrinkable film for labeling or packaging is applied on a container to shrink under a heat source, for example, a steam tunnel or a hot air tunnel. Therefore, the heat-shrinkable film should have shrinkage characteristics which are satisfactory for subsequent packaging applications. A typical shrinkage process requires the heat-shrinkable film to be exposed to the heat for at least 5 seconds, or for nearly 10 seconds, during which the heat-shrinkable film starts shrinking as the temperature of the heat approaches the glass transition temperature (hereinafter abbreviated as Tg) of the heat-shrinkable film. When the temperature of the heat reaches the Tg of the heat-shrinkable film, the film exhibits obvious shrinkage.

Based on the abovementioned characteristics of the heat-shrinkable film, current measurements for evaluating whether the performances of the heat-shrinkable film meet the requirements for labeling and packaging are as follows:

(1) the heat-shrinkability is measured after treatment in an environment at a temperature higher than the Tg of the heat-shrinkable film for 10 seconds, which should be high enough (e.g., greater than 75%) for labeling and packaging of containers with high curvatures;

(2) the heat-shrinkability is measured after treatment in an environment at the Tg for 10 seconds, which should be in a suitable range (e.g., at most 90% of the highest shrinkability), so as to effectively maintain an adequate shrinkage rate of the heat-shrinkable film by adjusting a rate at which the film passes through the hot air tunnel, the temperature and length of the hot air tunnel, etc.;

(3) the heat-shrinkability is measured after treatment in an environment at a temperature lower than the Tg of the heat-shrinkable film for 10 seconds, and as the measured temperature decreases, the shrinkage rate approaches 0%, and thus the lowest temperature that allows a shrinkage rate greater than 0% is defined as the initial shrinking temperature, which usually increases with long storage or transportation time.

U.S. Pat. No. 6,548,595B2 discloses a heat-shrinkable polyester resin film that is made of a polyester resin including at least one glycol of 3 to 6 carbon atoms, and that has a Tg ranging from 60° C. to 75° C. In the embodiments of the patented invention, polyethylene terephthalate (PET), PET modified with neopentyl glycol (NPG-modified PET), and polybutylene terephthalate (PBT) were blended and stretched to make the heat-shrinkable polyester resin film. The heat-shrinkability of the heat-shrinkable polyester resin film ranges from 5% to 60% in a transverse direction (i.e., a direction transverse to a machine direction) of the film after treatment in hot water at 70° C. (near the Tg) for 5 seconds, and at 67% or higher after treatment in hot water at 85° C. (higher than Tg) for 5 seconds. However, for labeling and packaging of PET bottles, such heat-shrinkability may not meet the requirements especially for bottles with high curvatures (e.g., a heat-shrinkability of 75% or higher after treatment in hot water at 95° C. for 10 seconds). In addition, the patented invention did not take into consideration a potential decrease in the heat-shrinkability of the film due to a long storage time, which may alter the initial shrinking temperature, thereby causing a change in the heat-shrinkability of over 11%. Moreover, transesterification reactions may have occurred among PET, PBT, and NPG-modified PET, which may also account for the decrease in shrinkability after a long storage time.

SUMMARY

Therefore, a first object of the disclosure is to provide a heat-shrinkable polyester film having shrinkability and elongation at break, which meet the requirements for subsequent applications even after a long storage time or after transportations at high temperatures. A second object of the disclosure is to provide a process for making the heat-shrinkable polyester film.

According to a first aspect of the disclosure, a heat-shrinkable polyester film is made of a polyester resin composition, and has a first crystal melting peak at a first melting temperature and a second crystal melting peak at a second melting temperature determined via differential scanning calorimetry. The heat-shrinkable polyester film further has a melting enthalpy in a range of larger than 0 J/g and at most 7 J/g which is calculated via integration of an area below the second crystal melting peak. The first melting temperature is lower than the second melting temperature, and the polyester resin composition includes a first polyester resin having a glass transition temperature ranging from 40° C. to 80° C., and a second polyester resin having a crystal melting temperature ranging from 220° C. to 250° C. and a melting enthalpy ranging from 40 J/g to 60 J/g.

According to a second aspect of the disclosure, a process for making a heat-shrinkable polyester film includes the steps of:

(a) preparing a polyester resin composition including:

a first polyester resin having a glass transition temperature ranging from 40° C. to 80° C., and a second polyester resin having a crystal melting temperature ranging from 220° C. to 250° C. and a melting enthalpy ranging from 40 J/g to 60 J/g;

(b) subjecting the polyester resin composition to blending and extruding at a heating temperature at which a transesterification reaction between the first polyester resin and the second polyester resin is inhibited, so as to obtain a sheet; and (c) subjecting the sheet to film formation so as to obtain a heat-shrinkable polyester film.

BRIEF DESCRIPTION OF THE DRAWINGS

Other features and advantages of the disclosure will become apparent in the following detailed description of the embodiment (s) with reference to the accompanying drawing, of which.

DETAILED DESCRIPTION

Figure 2:
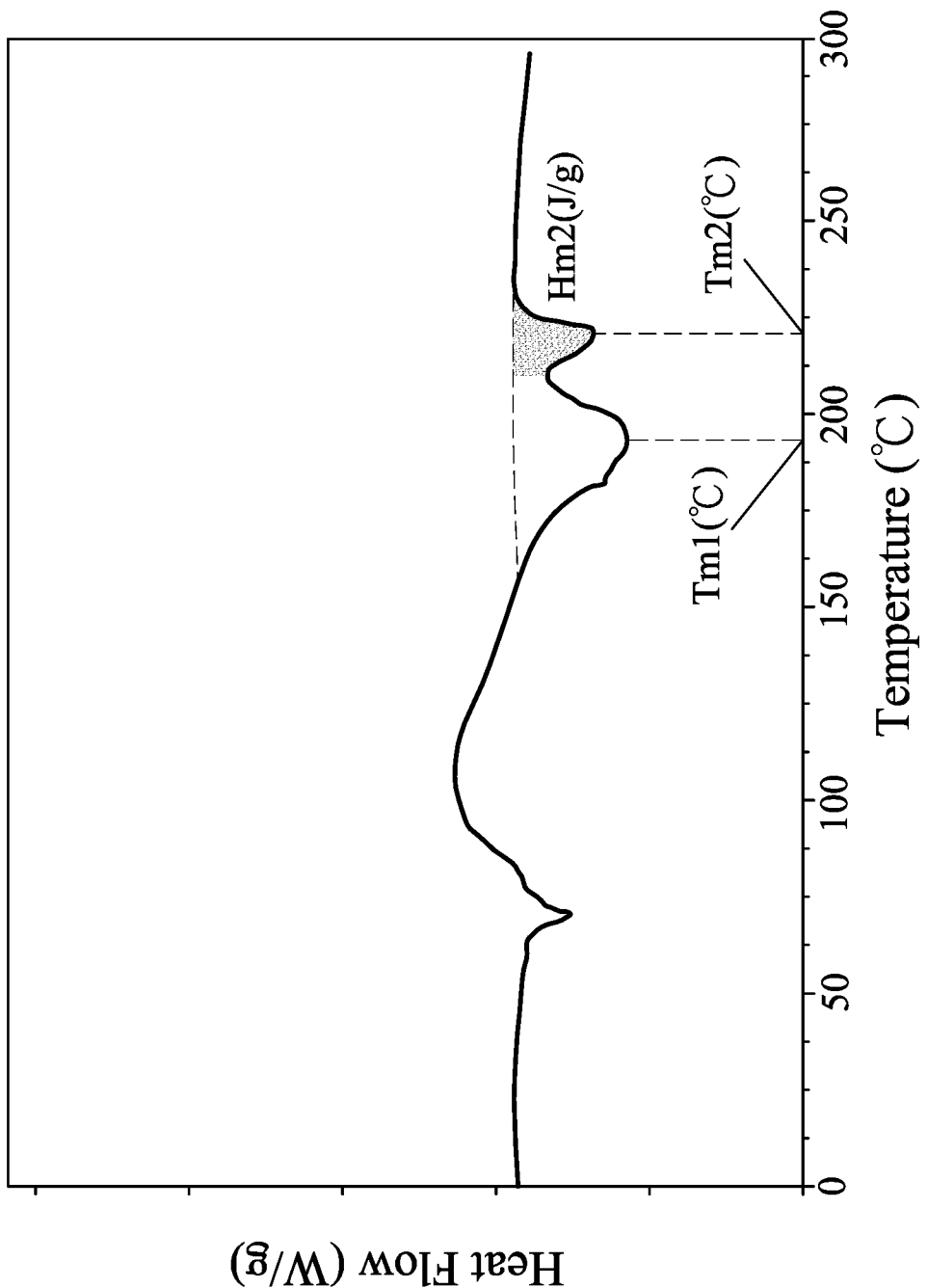
FIG. 2 depicts a DSC curve illustrating the locations of first and second crystal melting peaks of the heat-shrinkable polyester film in the Examples shown below.

Heat-Shrinkable Polyester Film:

Referring to FIG. 2, an embodiment of a heat-shrinkable polyester film according to the disclosure is made of a polyester resin composition, and has a first crystal melting peak at a first melting temperature (Tm1) and a second crystal melting peak at a second melting temperature (Tm2) determined via differential scanning calorimetry (hereinafter abbreviated as DSC). The heat-shrinkable polyester film further has a melting enthalpy (Hm2) in a range of larger than 0 J/g and at most 7 J/g which is calculated via integration of an area below the second crystal melting peak. The first melting temperature (Tm1) is lower than the second melting temperature (Tm2), and the polyester resin composition includes a first polyester resin having a glass transition temperature ranging from 40° C. to 80° C., and a second polyester resin having a crystal melting temperature ranging from 220° C. to 250° C. and a melting enthalpy ranging from 40 J/g to 60 J/g and an intrinsic viscosity within a range of 0.7 to 0.9.

In certain embodiments, the DSC is conducted at a temperature ranging from −50° C. to 300° C. at a heating rate of 10° C./min.

In certain embodiments, the second melting temperature (Tm2) is in a range from 220° C. to 250° C. In certain embodiments, the second melting temperature (Tm2) is in a range from 220° C. to 230° C. In the examples shown below, the second melting temperature (Tm2) is in a range from 220° C. to 225° C.

In certain embodiments, the melting enthalpy (Hm2) of the heat-shrinkable polyester film is in a range from 1 J/g to 5 J/g.

In certain embodiments, the heat-shrinkable polyester film of the disclosure has the following properties:

1) a heat-shrinkability of at least 76% in a transverse direction (i.e., a direction transverse to a machine direction), which is measured according to JIS Z1709 after immersing in hot water at 95° C. for 10 seconds and then removing from the hot water;

2) an absolute value of difference between the heat-shrinkability in the transverse direction before accelerated aging and the heat-shrinkability in the transverse direction after the accelerated aging determined according to JIS Z1709, which is at most 11%, wherein the heat-shrinkability in the transverse direction before the accelerated aging is measured after immersing in hot water at 70° C. for 10 seconds, and the heat-shrinkability in the transverse direction after the accelerated aging is measured after baking at 60° C. for an hour followed by immersing in hot water at 70° C. for 10 seconds; and 3) an elongation at break of greater than 400% in the transverse direction determined according to ASTM D882 after the accelerated aging.

Polyester Resin Composition:

The polyester resin composition for making the heat-shrinkable polyester film of the disclosure includes a first polyester resin and a second polyester resin. The amount of the first and second polyester resins can be adjusted based on the desired DSC properties of the heat-shrinkable polyester film, and/or the types or properties of the first and second polyester resins. In certain embodiments, a weight ratio of the second polyester resin to the polyester resin composition ranges from 2 wt % to 15 wt %. In certain embodiments, the weight ratio of the second polyester resin to the polyester resin composition ranges from 2.5 wt % to 12 wt %.

The polyester resin composition may further include other additives according to subsequent needs. Examples of the additives include, but are not limited to, catalysts, stabilizers, antioxidants, antistatic agents, antifoam agents, textile auxiliaries, dyes, colorants, delustrants, fluorescent brighteners, etc. Examples of the catalysts include, but are not limited to, antimony oxide, titanium-containing catalysts, germanium-containing catalysts, tin-containing catalysts, gallium-containing catalysts, aluminum-containing catalysts, and combinations thereof. Examples of the stabilizers include, but are not limited to, phosphoric acid, trimethyl phosphate, triethyl phosphate, triethyl phosphonoacetate, and tripropyl phosphate (TPP).

First Polyester Resin:

The first polyester resin has a glass transition temperature ranging from 40° C. to 80° C. In certain embodiments, the glass transition temperature ranges from 70° C. to 80° C.

In certain embodiments, the first polyester resin is a modified polyester resin. In certain embodiments, the first polyester resin is made by subjecting a mixture, which includes one of terephthalic acid, recycled terephthalic acid (rTPA), and the combination thereof, one of ethylene glycol, biobased ethylene glycol, and the combination thereof, and a modifier, to polymerization. There is no specific limitation to the modifier, except that the first polyester resin should have a glass transition temperature in a range from 40° C. to 80° C. In certain embodiments, the modifier is selected from the group consisting of isophthalic acid, neopentyl glycol, 1,4-cyclohexanedimethanol, and combinations thereof. In certain embodiments, when neopentyl glycol is used as the modifier, a molar ratio of ethylene glycol to neopentyl glycol ranges from 70:30 to 85:15.

Second Polyester Resin:

The second polyester resin has a crystal melting temperature ranging from 220° C. to 250° C., and a melting enthalpy ranging from 40 J/g to 60 J/g. In certain embodiments, the second polyester resin has a crystal melting temperature ranging from 220° C. to 230° C., and a melting enthalpy ranging from 45 J/g to 55 J/g, and an intrinsic viscosity within a range of 0.7 to 0.9.

Examples of the second polyester resin include, but are not limited to, polybutylene terephthalate (PBT), polytrimethylene terephthalate (PTT), and the combination thereof. In the examples shown below, the second polyester resin is PBT.

Process for Making the Heat-Shrinkable Polyester Film:

A process for making a heat-shrinkable polyester film according to the disclosure includes the steps of:

(a) preparing a polyester resin composition including:

a first polyester resin having a glass transition temperature ranging from 40° C. to 80° C., and a second polyester resin having a crystal melting temperature ranging from 220° C. to 250° C. and a melting enthalpy ranging from 40 J/g to 60 J/g;

(b) subjecting the polyester resin composition to blending and extruding at a heating temperature at which a transesterification reaction between the first polyester resin and the second polyester resin is inhibited, so as to obtain a sheet; and (c) subjecting the sheet to film formation so as to obtain a heat-shrinkable polyester film.

The polyester resin composition, and the first and second polyester resins used in step (a) are as described above. The polyester resin composition may be prepared by any method well known in the art, such as blending the first and second polyester resins to obtain the polyester resin composition.

The heating temperature in step (b) is a temperature at which a transesterification reaction between the first polyester resin and the second polyester resin is inhibited, such that the DSC curve of the heat-shrinkable polyester film made by this process has a first crystal melting peak and a second crystal melting peak. In the examples shown below, the second polyester resin is polybutylene terephthalate (PBT), and the heating temperature in step (b) is not lower than 210° C. and not greater than 260° C. In step (b), the sheet may be obtained by blending and extruding the polyester resin composition using a twin-screw extruder.

The crystal melting temperature of the second polyester resin may be measured using any method well known in the art. In certain embodiments, the crystal melting temperature is measured using a differential scanning calorimeter.

It is worth mentioning that, in order to solve the aging problem of heat-shrinkable films such as decreased shrinkability after a long storage time or transportation at high temperatures, in step (b) of the process according to the disclosure, the heating temperature is controlled so as to inhibit the transesterification reaction between the first and second polyester resins as they are blended and extruded. Therefore, in the following step (c), both the first and second polyester resins are able to provide nucleus in film formation, so that the heat-shrinkable polyester film made by this process may have crystalline orientations of the two polyester resins. In other words, the hard segments of the second polyester resin may effectively inhibit the aging and relaxation of the first polyester resin, thereby ensuring an optimal shrinkability even after a long storage time or after transportation at high temperatures.

The film formation in step (c) may be conducted in a manner well-known in the art. For example, a polyester film may be formed by first preheating and softening the sheet, then stretching the sheet in a direction (for example, the transverse direction) to a length that is 4 to 5 times the original length of the sheet under a temperature ranging from 75° C. to 85° C. until an extended polyester film with a thickness of 35 μm to 50 μm is formed, and finally, annealing the extended polyester film under an annealing temperature of 50° C. to 80° C. to obtain the heat-shrinkable polyester film of the disclosure.

Examples of the disclosure will be described hereinafter. It is to be understood that these examples are exemplary and explanatory and should not be construed as a limitation to the disclosure.

Chemicals:

The following chemicals are used in both the examples and the comparative examples shown below.

1. The first polyester resin (NPG-modified PET, hereinafter referred to as P1 polyester chip):

37311.1 g (224.6 mol) of terephthalic acid, 14027.4 g (226.0 mol) of ethylene glycol, 5701.6 g (54.8 mol) of neopentyl glycol (NPG), and 13.5 g of tetraethylammonium hydroxide were mixed in a reactor to obtain a mixture. The ethylene glycol has an amount of 80.5 mol % and the neopentyl glycol has an amount of 19.5 mol % based on a total amount of 100 mol % of ethylene glycol and neopentyl glycol in the mixture. Subsequently, after the mixture in the reactor was heated to 250° C. and evenly mixed, the mixture was subjected to an esterification reaction under an atmosphere of nitrogen gas while the thus produced water was removed via distillation until an amount of the water removed reached a theoretical value of esterification. Next, 300 parts per million (ppm) of antimony trioxide and 50 ppm of phosphoric acid were added into the reactor to obtain a reactant, followed by polycondensation of the reactant at a temperature of 275° C. under a vacuum atmosphere. The polycondensation proceeded until an intrinsic viscosity (IV) of the reactant reaches a range from 0.5 to 0.7, followed by pelletization using a pelletizer to obtain the P1 polyester chips that have a glass transition temperature of 78° C.

2. The second polyester resin (PBT, hereinafter referred to as P2 polyester chip):

The P2 polyester chips were purchased from Chang Chun Group (Model No.: 1200-211D), and have an intrinsic viscosity ranging from 0.730 to 0.770, a crystal melting temperature of 223° C., and a melting enthalpy of 49 J/g.

Example 1 (EX1): Preparation of a Heat-Shrinkable Polyester Film (a) The P1 and P2 polyester chips were dried until a moisture content thereof was 200 ppm or lower. The dried P1 and P2 polyester chips were then blended in a weight ratio of 97.5: 2.5 to obtain a polyester resin composition.

(b) The polyester resin composition was then fed into a layer B of a twin-screw extruder, while a layer A of the twin-screw extruder was fed with the dried P1 polyester chips, followed by melting and extruding the dried P1 polyester chips in layer A and the polyester resin composition in layer B via a stepwise heating procedure with a lowest heating temperature of 210° C. and a highest heating temperature of 260° C., simultaneously passing through a diverter and extruding through a T-die head, and then the molten polyester is brought into contact with a casting roll while cooling rapidly to obtain a sheet having a layered structure that includes layer A, layer B and layer A arranged in such order, in which each of layer A has a thickness that equals to 7% of a total thickness of the sheet, and layer B has a thickness that equals to 86% of the total thickness of the sheet.

(c) The sheet was then processed through a stretching machine (Manufacturer: Brückner Maschinenbau; Model: KARO IV) at a rate of 45 M/min at a preheating temperature of 98° C., followed by stretching in the transverse direction to a length that is 4.8 times the original length at a stretching temperature of 83° C., and finally annealing at an annealing temperature of 76° C. to obtain a heat-shrinkable polyester film of EX1 with a thickness of 40 μm.

Examples 2 to 4 (EX2 to EX4)

The procedures and conditions for preparing the heat-shrinkable polyester films of EX2 to EX4 were similar to those of EX1, except that the weight percentages of P1 and P2 polyester chips used in step (a), and the preheating temperature, the stretching temperature, and the annealing temperature in step (c) were varied as shown in Table 1 below.

TABLE 1

| Steps | | EX1 | EX2 | EX3 | EX4 |
|---|---|---|---|---|---|
| (a) | Weight percentage of P1 (wt %) | 97.5 | 95.0 | 90.0 | 88.0 |
| | Weight percentage of P2 (wt %) | 2.5 | 5.0 | 10.0 | 12.0 |
| (b) | Heating temperature (° C.) | 210~260 | 210~260 | 210~260 | 210~260 |
| (c) | Preheating temperature (° C.) | 98 | 97 | 92 | 92 |
| | Stretching temperature (° C.) | 83 | 82 | 77 | 77 |
| | Annealing temperature (° C.) | 76 | 75 | 70 | 70 |

Comparative Example 1 (CE1)

The heat-shrinkable polyester film of CE1 was made by drying the P1 polyester chips, and feeding the dried P1 polyester chips into both layer A and layer B of the twin-screw extruder, followed by melting and extruding the dried P1 polyester chips via a stepwise heating procedure with a lowest heating temperature of 210° C. and a highest heating temperature of 260° C., and the molten polyester is brought into contact with a casting roll while cooling rapidly to obtain a sheet. Finally, the sheet was processed as mentioned instep (c) of EX1 with the heating temperature, the stretching temperature, and the annealing temperature as presented in Table 2.

Comparative Examples 2 to 7 (CE2 to CE7)

The procedures and conditions for preparing heat-shrinkable polyester films of CE2 to CE7 were similar to those of EX1 except that the weight percentages of P1 and P2 polyester chips used in step (a), the heating temperature in step (b), and the preheating temperature, the stretching temperature, and the annealing temperature in step (c) were varied as shown in Table 2 below.

Comparative Examples 8 and 9 (CE8 and CE9)

The procedures and conditions for preparing heat-shrinkable polyester films of CE8 and CE9 were similar to those of EX1 except that in step a), a third polyester resin (PET, hereinafter referred to as P3 polyester chips) which has an intrinsic viscosity (IV) of 0.62, a crystal melting temperature of 251.4° C., and a melting enthalpy of 40.0 J/g was used in addition to the P1 and P2 polyester chips.

The P3 polyester chips were made by the following process. 37311.1 g (234.2 mol) of terephthalic acid, 18169.43g (292.7 mol) of ethylene glycol, and 13.5 g of tetraethylammonium hydroxide were mixed in a reactor to obtain a mixture. After the mixture in the reactor was heated to a temperature of 250° C. and evenly mixed, the mixture was subjected to an esterification reaction under nitrogen atmosphere, and the thus produced water was removed via distillation until an amount thereof reached a theoretical value of esterification. Next, 300 parts per million (ppm) of antimony trioxide and 50 ppm of phosphoric acid were added into the reactor to obtain a reactant, followed by polycondensation of the reactant to a temperature of 275° C. under a vacuum atmosphere. The polycondensation proceeded until an intrinsic viscosity of the reactant reached 0.62, followed by pelletization using a pelletizer to obtain the P3 polyester chips.

The weight percentages of P1, P2, and P3 polyester chips used in step a) are as shown in Table 2 below. In addition, the heating temperature in step (b), and the preheating temperature, the stretching temperature, and the annealing temperature in step (c) were varied as shown in Table 2 below.

TABLE 2

| Steps | | Comparative Examples | | | | | | | | |
|---|---|---|---|---|---|---|---|---|---|---|
| | | CE1 | CE2 | CE3 | CE4 | CE5 | CE6 | CE7 | CE8 | CE9 |
| (a) | Weight percentage of P1 (wt %) | 100 | 97.5 | 90.0 | 85.0 | 75.0 | 70.0 | 65.0 | 75.0 | 60.0 |
| | Weight percentage of P2 (wt %) | 0 | 2.5 | 10.0 | 15.0 | 25.0 | 30.0 | 35.0 | 10.0 | 25.0 |
| | Weight percentage of P3 (wt %) | 0 | 0 | 0 | 0 | 0 | 0 | 0 | 15.0 | 15.0 |
| (b) | Heating temperature (° C.) | 210~260 | 280 | 280 | 210~260 | 210~260 | 210~260 | 210~260 | 280 | 280 |
| (c) | Preheating temperature (° C.) | 98 | 98 | 94 | 91 | 87 | 85 | 85 | 94 | 87 |
| | Stretching temperature (° C.) | 83 | 83 | 79 | 76 | 72 | 70 | 70 | 79 | 72 |
| | Annealing temperature (° C.) | 76 | 76 | 72 | 69 | 65 | 63 | 63 | 72 | 65 |

Property Evaluations:

Heat-shrinkable polyester films of EX1 to EX4 and CE1 to CE9 were selectively evaluated with the following tests. The results are presented in Tables 3 and 4.

1. Glass Transition Temperature (Tg, ° C.) Test:

Each of the heat-shrinkable polyester films was analyzed by a differential scanning calorimeter (DSC) (Manufacturer: TA Instruments, USA; Model: 2910 Modulated DSC). A test temperature was raised from −50° C. to 300° C. at a heating rate of 10° C./minute. The results are presented in Table 4.

Figure 1:
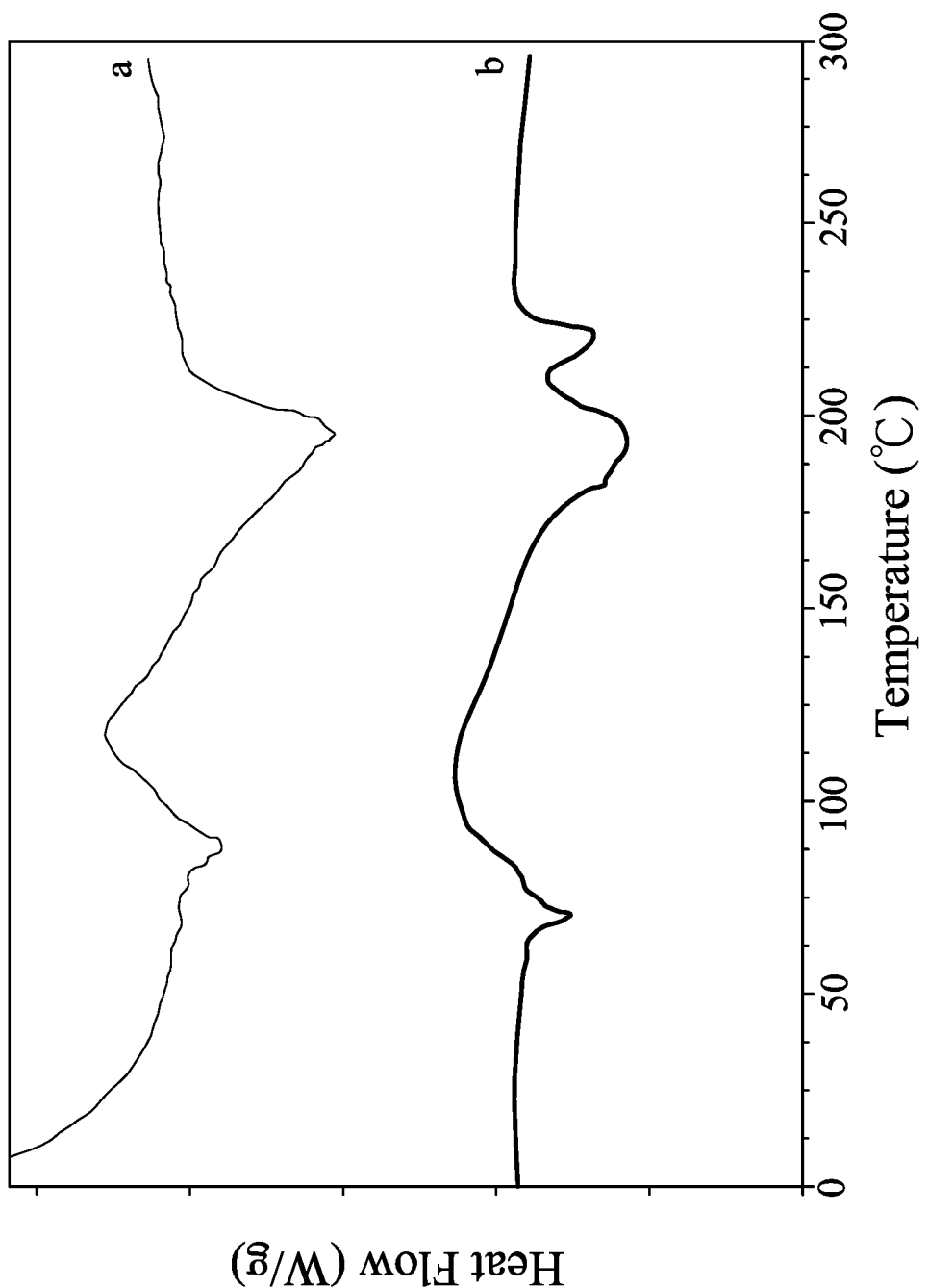
FIG. 1 depicts two differential scanning calorimetry (DSC) curves illustrating whether a transesterification reaction has occurred in the Examples and Comparative Examples shown below, in which curve (a) indicates the occurrence of the transesterification reaction among polyesters, and curve (b) indicates the lack of the transesterification reaction among the polyesters.

2. Transesterification Evaluation:

A DSC curve (as exemplified in FIG. 1) obtained from the Glass Transition Temperature Test was used to evaluate whether a transesterification reaction had occurred by inspecting if a crystal melting peak was found in a temperature range of from 220° C. to 250° C. The results are presented in Table 4. The evaluation for the occurrence of the transesterification reaction follows the standards below:

(1) deemed positive (denoted as "O" in Table 4) if no crystal melting peak was found at the temperature range of from 220° C. to 250° C., as illustrated by the curve "a" in FIG. 1, indicating the occurrence of the transesterification reaction between the polyester resins; and (2) deemed negative (denoted as "X" in Table 4) if a crystal melting peak was found at the temperature range of from 220° C. to 250° C., as illustrated by the curve "b" in FIG. 1, indicating the lack of the transesterification reaction between the polyester resins.

3. Evaluation of the first melting temperature (° C.) of the first crystal melting peak, the second melting temperature (° C.) of the second crystal melting peak, and the melting enthalpy (J/g):

The DSC curve of each of the heat-shrinkable polyester films of EX1 to EX4 and CE1 to CE9 was analyzed. The first melting temperatures (Tm1) of the first crystal melting peak and the second melting temperatures (Tm2) of the second crystal melting peak were recorded, and then the melting enthalpy (Hm2) was calculated via integration of the heat flow over time of the second crystal melting peak for areas below the peak. The results are presented in Table 3.

4. Evaluation of the absolute value of the difference between shrinkabilities in the transverse direction before and after accelerated aging at 70° C. (abbreviated as |70° C.ΔTD |, %):

Each of the heat-shrinkable polyester films of EX1 to EX4 and CE1 to CE9 was first cut into a test sample having a dimension of 100 mm (in the machine direction)×100 mm (an original length $L_0$ in the transverse direction) according to JIS Z1709 sample.

Then, the shrinkability in the transverse direction at 70° C. before accelerated aging (70° C. TD %) was measured, wherein the test sample was immersed in hot water at 70° C. for 10 seconds, followed by cooling in cold water at 30° C. for 30 seconds. A first length $L_1$ (mm) of the test sample in the transverse direction was then recorded. The shrinkability at 70° C. was calculated based on the formula:

$$70° C. TD \% = [(L_0-L_1)/L_0] \times 100\%,$$

wherein $L_0$ is the original length of the test sample, which is 100 mm, and $L_1$ is the length of the test sample after immersion in hot water at 70° C.

Subsequently, the shrinkability in the transverse direction at 70° C. after the accelerated aging (accelerated aging 70° C. TD %) was measured, in which another test sample was baked in an oven at 60° C. for an hour for the accelerated aging, followed by immersing the thus baked test sample in hot water at 70° C. for 10 seconds, and then cooling the sample in cold water at 30° C. for 30 seconds. A second length $L_2$ (mm) of the test sample in the transverse direction was then recorded. The shrinkability at 70° C. after the accelerated aging was calculated based on the formula:

$$\text{accelerated aging } 70° C. TD \% = [(L_0-L_2)/L_0] \times 100\%,$$

wherein $L_0$ is the original length of the test sample in the transverse direction, which is 100 mm, and $L_2$ is the length of the test sample after the accelerated aging and after immersion in hot water at 70° C.

Finally, the absolute value of the difference between the shrinkabilities of the heat-shrinkable polyester films in the transverse direction before and after the accelerated aging was calculated based on the following formula, and the results are presented in Table 4:

$$|70° C.\Delta TD| = |(\text{accelerated aging } 70° C. TD \%) - (70° C. TD \%)|.$$

According to the requirements from downstream manufacturers, the absolute value of 70° C.ΔTD should be less than 11%.

5. The shrinkability in the transverse direction after heat treatment at 95° C. (95° C. TD %, %):

Each of the heat-shrinkable polyester films of EX1 to EX4 and CE1 to CE9 was first cut to obtain a test sample having a dimension of 100 mm (in the machine direction)×100 mm (an original length $L_0$ in the transverse direction) according to JIS Z1709.

Subsequently, each of the test samples was subjected to heat treatment by immersing in hot water at 95° C. for 10 seconds, and then cooling the sample in cold water at 30° C. for 30 seconds. A third length $L_3$ (mm) of the test sample in the transverse direction was recorded. Finally, the shrinkability of the test sample in the transverse direction after heat treatment at 95° C. was calculated based on the formula:

$$95° C. TD \% = [(L_0-L_3)/L_0] \times 100\%,$$

wherein $L_0$ is the original length of the test sample in the transverse direction, which is 100 mm, and $L_3$ is the length of the test sample after heat treatment at 95° C.

For applications with stringent requirements, such as bottles with high curvatures, a test sample should exhibit a 95° C. TD % of not less than 76%. The results are presented in Table 4.

6. Elongation at break in the machine direction after accelerated aging (abbreviated as MD elongation at break after accelerated aging (%)):

Each of the heat-shrinkable polyester films of EX1 to EX4 and CE1 to CE9 was cut to obtain a test sample having a dimension of 150 mm (machine direction)×15 mm (transverse direction) according to ASTM D882. The test sample was then baked in an oven at 60° C. for an hour, followed by testing the test sample using a material testing machine (Manufacturer: Cometech Testing Machines Co.; Model No.: QC-508B1), in which the test sample was fixated by two chucks at both ends thereof in the machine direction (the distance between the chucks: 100 mm), and then stretched at an elongation rate of 100 mm/min until break. The length of the test sample $L_4$ in the machine direction (mm) at break was recorded, and the elongation in the machine direction at break was calculated based on the formula:

MD elongation at break after accelerated aging=
$[(L_4-L_0)/L_0] \times 100\%,$ wherein $L_0$ is the original length of the test sample in the machine direction, which is 150 mm, and $L_4$ is the length of the test sample in the machine direction at break.

According to requirements set by downstream manufacturers, the elongation at break in the machine direction of the heat-shrinkable polyester films should be greater than 400%.

TABLE 3

|  | Tm1 (° C.) | Tm2 (° C.) | Hm2 (J/g) |
| --- | --- | --- | --- |
| EX1 | 197.94 | 221.99 | 1.107 |
| EX2 | 197.25 | 222.77 | 2.018 |
| EX3 | 194.36 | 222.43 | 4.439 |
| EX4 | 197.26 | 224.33 | 4.975 |
| CE1 | 196.82 | — | — |
| CE2 | 196.24 | — | — |
| CE3 | 194.13 | — | — |
| CE4 | 197.23 | 223.21 | 7.564 |
| CE5 | 197.55 | 221.86 | 10.909 |
| CE6 | 195.48 | 224.90 | 17.12 |
| CE7 | 196.76 | 219.35 | 13.60 |
| CE8 | 205.61 | — | — |
| CE9 | 201.43 | — | — |

TABLE 4

|  |  | Tg (° C.) | Occurrence of transesterification reaction | \|70° C. ΔTD %\| | 95° C. TD % | MD elongation at break after accelerated aging (%) |
| --- | --- | --- | --- | --- | --- | --- |
| EX | 1 | 77.9 | X | 10.4 | 76.7 | 474 |
|  | 2 | 77.1 | X | 9.4 | 76.5 | 515 |
|  | 3 | 71.9 | X | 7.6 | 77.4 | 533 |
|  | 4 | 71.5 | X | 8.0 | 77.5 | 518 |
| CE | 1 | 78.1 | Not measured (only P1 polyester chip used) | 21.8 | 76.1 | 505 |
|  | 2 | 77.9 | ○ | 21.7 | 76.3 | 486 |
|  | 3 | 73.8 | ○ | 25.1 | 77.0 | 491 |
|  | 4 | 71.2 | X | 10.0 | 74.0 | 513 |
|  | 5 | 67.1 | X | 8.7 | 71.9 | 517 |
|  | 6 | 65.3 | X | 7.2 | 61.0 | 106 |
|  | 7 | 64.9 | X | 5.6 | 55.3 | 65 |
|  | 8 | 72.1 | ○ | 19.2 | 76.3 | 498 |
|  | 9 | 68.2 | ○ | 14.1 | 76.0 | 405 |

Discussion of Results

1. Based on the results in Tables 3 and 4, the heat-shrinkable polyester films of CE2, CE3, CE8, and CE9 only had the first crystal melting peak, indicating occurrence of the transesterification reaction between the polyester resins, which may be due to extrusion under a high temperature of 280° C. (see Table 2). Likewise, the heat-shrinkable polyester film of CE1 only had the first crystal melting peak due to the fact that only P1 polyester chips (i.e., NPG-modified PET) were used for the preparation thereof. On the other hand, although the heat-shrinkable polyester films of CE4 to CE7 had both the first and second crystal melting peaks, the melting enthalpies (Hm2) were all higher than 7 J/g, which may adversely affect the properties of the heat-shrinkable polyester films. In comparison, all of the heat-shrinkable films of EX1 to EX4 had both the first and second crystal melting peaks, and at the same time, had melting enthalpies (Hm2) that are greater than 0 J/g and less than 7 J/g. It is thus evident that the heat-shrinkable polyester films made with the process according to the disclosure had special properties which are associated with the first and second crystal melting peaks.

2. A comparison of the heat-shrinkable polyester films of EX1 to EX4 with that of CE1 was made below based on the results in Table 4, and are summarized in Table 5 below.

(1) |70° C.ΔTD %|: The |70° C.ΔTD %| values of EX1 to EX4 (10.4, 9.4, 7.6, and 8.0, respectively) are obviously lower than that of CE1 (21.8). In addition, the |70° C.ΔTD %| values of EX1 to EX4 are within the commercially required range of not greater than 11%, which indicates an evident decrease in the change of shrinkability at 70° C. after accelerated aging due to the addition of P2 polyester chips.

(2) 95° CTD % and MD elongation at break after accelerated aging (%): The results of EX1 to EX4 are similar to that of CE1, indicating that the addition of P2 polyester chips does not affect 95° CTD % and MD elongation at break after accelerated aging (%).

TABLE 5

|  |  | EX | | | |
| --- | --- | --- | --- | --- | --- |
|  | CE1 | 1 | 2 | 3 | 4 |
| Weight percentage of P1 polyester chips (wt %) | 100 | 97.5 | 95.0 | 90.0 | 88.0 |
| Weight percentage of P2 polyester chips (wt %) | 0 | 2.5 | 5.0 | 10.0 | 12.0 |
| \|70° CΔTD %\| | 21.8 | 10.4 | 9.4 | 7.6 | 8.0 |
| 95° CTD % | 76.1 | 76.7 | 76.5 | 77.4 | 77.5 |
| MD elongation at break after accelerated aging (%) | 505 | 474 | 515 | 533 | 518 |

3. A comparison between the heat-shrinkable polyester films of EX1 and CE2, and another comparison between those of EX3 and CE3 were made based on the results in Table 4, and are summarized in Table 6 below.

The |70° C.ΔTD %| value of EX1 (10.4) is much lower than that of CE2 (21.7), and the |70° C.ΔTD %| value of EX3 (7.6) is also much lower than that of CE3 (25.1), which indicates that when transesterification reaction occurs between the P1 and P2 polyester chips, the change of shrinkability after the accelerated aging may be increased, and thereby the corresponding heat-shrinkable polyester film of CE2 and CE3 may be unfavorable for subsequent application after a long storage or transportation time. On the contrary, the heat-shrinkable polyester film of this disclosure (i.e., EX1 to EX4) still satisfies subsequent application requirements even after a long storage or transportation time.

TABLE 6

|  | EX1 | CE2 | EX3 | CE3 |
| --- | --- | --- | --- | --- |
| Weight percentage of P1 polyester chips (wt %) | 97.5 | 97.5 | 90.0 | 90.0 |
| Weight percentage of P2 polyester chips (wt %) | 2.5 | 2.5 | 10.0 | 10.0 |
| Occurrence of transesterification reaction | X | ○ | X | ○ |
| \|70° CΔTD %\| | 10.4 | 21.7 | 7.6 | 25.1 |
| 95° CTD % | 76.7 | 76.3 | 77.4 | 77.0 |
| MD elongation at break after accelerated aging (%) | 474 | 486 | 533 | 491 |

4. A comparison between the heat-shrinkable polyester films of EX3 and CE8, and another comparison between those of CE5 and CE9 were made based on the results in Table 4, and are summarized in Table 7 below.

While the heat-shrinkable polyester films of EX3 and CE8 has the same amount of the P2 polyester chips therein, the |70° C.ΔTD %| value of EX3 (7.6) was much lower than that of CE8 (19.2). Similarly, while the heat-shrinkable polyester films of CE5 and CE9 has the same amount of the P2 polyester films therein, the |70° C.ΔTD %| value of CE5 (8.7) was also lower than that of CE9 (14.1).

Therefore, it can be concluded that the transesterification reaction which occurs between the P1, P2, and P3 polyester chips of CE8 and CE9 may increase the change of shrinkability after the accelerated aging.

TABLE 7

|  | EX3 | CE8 | CE5 | CE9 |
|---|---|---|---|---|
| Weight percentage of P1 polyester chips (wt %) | 90.0 | 75.0 | 75.0 | 60.0 |
| Weight percentage of P2 polyester chips (wt %) | 10.0 | 10.0 | 25.0 | 25.0 |
| Weight percentage of P3 polyester chips (wt %) | 0 | 15 | 0 | 15 |
| Occurrence of transesterification reaction | X | ○ | X | ○ |
| |70° CΔTD %| | 7.6 | 19.2 | 8.7 | 14.1 |
| 95° CTD % | 77.4 | 76.3 | 71.9 | 76.0 |
| MD elongation at break after accelerated aging (%) | 533 | 498 | 517 | 405 |

5. Based on the results in Tables 2 and 4, it can be noted that although addition of P2 polyester chips in the heat-shrinkable polyester films of CE4 to CE7 (i.e., the weight percentage of P2 polyester chips ranges from 15% to 35%) was effective in decreasing the change of shrinkability at 70° C. after accelerated aging |70° C.ΔTD %|, at the same time the 95° C.TD % values thereof were adversely affected, and thus the stringent requirements for certain applications can no longer be met. The MD elongation at break after accelerated aging of the heat-shrinkable polyester films of CE6 and CE7 were also highly affected by the high weight percentages of the P2 polyester chips therein, such that the heat-shrinkable polyester films of CE6 and CE7 were relatively brittle, which may affect the stability thereof for subsequent applications (e.g., labeling).

In sum, the heat-shrinkable polyester film of the disclosure has special properties that are associated with both the first and second crystal melting peaks, and can be made by a specific composition and/or specific process. Therefore, the heat-shrinkable polyester film of the disclosure may satisfy stringent requirements for subsequent applications, such as packaging or labeling of bottles with high curvatures. The heat-shrinkable polyester film of the disclosure can also solve the problem of high shrinkability change after a long storage or transportation time.

In the description above, for the purposes of explanation, numerous specific details have been set forth in order to provide a thorough understanding of the embodiments. It will be apparent, however, to one skilled in the art, that one or more other embodiments maybe practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A heat-shrinkable polyester film made of a polyester resin composition, and having a first crystal melting peak at a first melting temperature and a second crystal melting peak at a second melting temperature determined via differential scanning calorimetry and further having a melting enthalpy in a range of larger than 0 J/g and at most 7 J/g which is calculated via integration of an area below said second crystal melting peak,
    wherein said first melting temperature is lower than said second melting temperature, and
    wherein said polyester resin composition includes a first polyester resin having a glass transition temperature ranging from 40° C. to 80° C., and a second polyester resin having a crystal melting temperature ranging from 220° C. to 250° C. and a melting enthalpy ranging from 40 J/g to 60 J/g.

2. The heat-shrinkable polyester film according to claim 1, wherein a weight ratio of said second polyester resin to said polyester resin composition ranges from 2 wt % to 15 wt %.

3. The heat-shrinkable polyester film according to claim 1, wherein said first polyester resin is made by subjecting a mixture including one selected from the group consisting of terephthalic acid, recycled terephthalic acid, and the combination thereof, and one selected from the group consisting of ethylene glycol, biobased ethylene glycol, and the combination thereof to polymerization.

4. The heat-shrinkable polyester film according to claim 3, wherein said mixture further includes a modifier selected from the group consisting of isophthalic acid, neopentyl glycol, 1,4-cyclohexanedimethanol, and combinations thereof.

5. The heat-shrinkable polyester film according to claim 4, wherein said modifier is said neopentyl glycol.

6. The heat-shrinkable polyester film according to claim 5, wherein a molar ratio of said ethylene glycol to said neopentyl glycol ranges from 70:30 to 85:15.

7. The heat-shrinkable polyester film according to claim 1, wherein said second polyester resin is polybutylene terephthalate.

8. The heat-shrinkable polyester film according to claim 7, wherein said second melting temperature ranges from 220° C. to 230° C.

9. The heat-shrinkable polyester film according to claim 8, having:
    a heat-shrinkability of at least 76% in a transverse direction, which is measured according to JIS Z1709, by immersing the heat-shrinkable polyester film in hot water at 95° C. for 10 seconds and then removing from the hot water;
    an absolute value of difference between said heat-shrinkability in said transverse direction before accelerated aging and said heat-shrinkability in said transverse direction after said accelerated aging determined according to JIS Z1709, which is at most 11%, wherein said heat-shrinkability in said transverse direction before said accelerated aging is measured after immersing in hot water at 70° C. for 10 seconds, and said heat-shrinkability in said transverse direction after said accelerated aging is measured after baking at 60° C. for an hour followed by immersing in hot water at 70° C. for 10 seconds; and an elongation at break of greater than 400% in said transverse direction determined according to ASTM D882 after said accelerated aging.

10. A process for making a heat-shrinkable polyester film, comprising the steps of:

(a) preparing a polyester resin composition including:

a first polyester resin having a glass transition temperature ranging from 40° C. to 80° C., and a second polyester resin having a crystal melting temperature ranging from 220° C. to 250° C. and a melting enthalpy ranging from 40 J/g to 60 J/g;

(b) subjecting the polyester resin composition to blending and extruding at a heating temperature at which a transesterification reaction between the first polyester resin and the second polyester resin is inhibited, so as to obtain a sheet; and (c) subjecting the sheet to film formation so as obtain a heat-shrinkable polyester film.

11. The process according to claim 10, wherein, in step (a), a weight ratio of the second polyester resin to the polyester resin composition ranges from 2 wt % to 15 wt %.

12. The process according to claim 10, wherein the first polyester resin is made by subjecting a mixture including one selected from the group consisting of terephthalic acid, recycled terephthalic acid, and the combination thereof, and one selected from the group consisting of ethylene glycol, biobased ethylene glycol, and the combination thereof to polymerization.

13. The process according to claim 12, wherein the mixture further includes a modifier selected from the group consisting of isophthalic acid, neopentyl glycol, 1,4-cyclohexanedimethanol, and combinations thereof.

14. The process according to claim 13, wherein the modifier is the neopentyl glycol.

15. The process according to claim 14, wherein a molar ratio of the ethylene glycol to the neopentyl glycol ranges from 70:30 to 85:15.

16. The process according to claim 10, wherein the second polyester resin is polybutylene terephthalate.

17. The process according to claim 16, wherein, in step (b), the heating temperature is not lower than 210° C. and not greater than 260° C.

18. A heat-shrinkable polyester film made by the process according to claim 10.

19. The heat-shrinkable polyester film according to claim 18, having:

a first crystal melting peak at a first melting temperature and a second crystal melting peak at a second melting temperature determined via differential scanning calorimetry, said first melting temperature being lower than said second melting temperature; and a melting enthalpy in a range of larger than 0 J/g and at most 7 J/g which is calculated via integration of an area below said second crystal melting peak.

20. The heat-shrinkable polyester film according to claim 19, wherein said second melting temperature ranges from 220° C. to 230° C.

21. The heat-shrinkable polyester film according to claim 18, having:

a heat-shrinkability of at least 76% in a transverse direction, which is measured according to JIS Z1709, by immersing the heat-shrinkable polyester film in hot water at 95° C. for 10 seconds and then removing from the hot water;

an absolute value of a difference between said heat-shrinkability in said transverse direction before accelerated aging and said heat-shrinkability in said transverse direction after said accelerated aging determined according to JIS Z1709, which is at most 11%, wherein said heat-shrinkability in said transverse direction before said accelerated aging is measured after immersing in hot water at 70° C. for 10 seconds, and said heat-shrinkability in said transverse direction after said accelerated aging is measured after baking at 60° C. for an hour followed by immersing in hot water at 70° C. for 10 seconds; and an elongation at break of greater than 400% in said transverse direction determined according to ASTM D882 after said accelerated aging.

* * * * *